United States Patent
Moon et al.

(10) Patent No.: US 12,040,459 B2
(45) Date of Patent: Jul. 16, 2024

(54) SYSTEM FOR BATTERY OF CAR HAVING ENERGY STORAGE PART

(71) Applicants: HYUNDAI MOTOR COMPANY, Seoul (KR); KIA CORPORATION, Seoul (KR)

(72) Inventors: Hyo-Sik Moon, Suwon-si (KR); Kyung-In Min, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 604 days.

(21) Appl. No.: 17/357,678

(22) Filed: Jun. 24, 2021

(65) Prior Publication Data

US 2022/0093978 A1    Mar. 24, 2022

(30) Foreign Application Priority Data

Sep. 22, 2020  (KR) .......................... 10-2020-0122625

(51) Int. Cl.
*H01M 10/42* (2006.01)
*H01M 10/44* (2006.01)

(52) U.S. Cl.
CPC ..... *H01M 10/4257* (2013.01); *H01M 10/441* (2013.01); *H01M 2010/4271* (2013.01); *H01M 2220/20* (2013.01)

(58) Field of Classification Search
CPC .......... H01M 10/4257; H01M 10/441; H01M 2010/4271; H01M 2220/20
USPC .......................................................... 429/90
See application file for complete search history.

(56) References Cited

U.S. PATENT DOCUMENTS

2019/0225109 A1*  7/2019  Ono ...................... B60L 3/0015
2019/0359078 A1* 11/2019  Yamada ................. B60L 58/12

FOREIGN PATENT DOCUMENTS

| EP | 2722961 A1 | 4/2014 |
| EP | 2930811 A1 | 10/2015 |
| EP | 3473487 A1 | 4/2019 |

* cited by examiner

*Primary Examiner* — James M Erwin
(74) *Attorney, Agent, or Firm* — Fox Rothschild LLP

(57) ABSTRACT

A system for a battery of a car is provided. The system includes a battery assembly having a first battery module and a second battery module, relays installed between contact points connected with respective terminals of the first battery module and the second battery module and controlling power supply from a driving motor of the car, a converter converting voltage input from the first battery module and the second battery module and supplying the converted voltage to a low-voltage electronic product, an energy storage part connected to an output terminal of the converter, and a battery management part controlling the same.

17 Claims, 9 Drawing Sheets

SYSTEM FOR BATTERY OF CAR HAVING ENERGY STORAGE PART

CROSS-REFERENCE TO RELATED APPLICATION

This application claims priority to and the benefit of Korean Patent Application No. 10-2020-0122625, filed on Sep. 22, 2020, the disclosure of which is incorporated herein by reference in its entirety.

TECHNICAL FIELD

The present disclosure relates to a system for a battery of a car.

BACKGROUND

In general, eco-friendly cars (hybrid cars, electric cars, fuel cell cars, etc.) equipped with electric motors for providing driving power of wheels are provided with high voltage batteries to provide high voltage energy for driving the electric motors.

Here, the high voltage generally means relatively higher voltage than a battery (in general, having a voltage of 11 to 14 V) provided for starting an engine driving car or supplying power to electronic product loads.

Accordingly, the eco-friendly car generally includes a high-voltage battery for driving the electric motor and a low-voltage battery for supplying the power to the electronic product load separately from each other. Managing mutual individual power systems by separating the high-voltage battery and the low-voltage battery not only results in system bloating, but also results in large loss in terms of efficiency.

In order to solve this, proposed is a high voltage-low voltage integrating system which uses some of a plurality of battery modules constituting the high-voltage battery for supplying low-voltage power by considering that one battery assembly is implemented by a plurality of cells or modules.

However, the conventional proposed high voltage-low voltage integrating system causes an unbalance of a charge state among the plurality of battery modules provided in one battery assembly, and as a result, there is a concern that efficiency or robustness of the system will deteriorate and instability of the car will be caused.

In the conventional proposed high voltage-low voltage integrating system, there was also a risk of instantaneous insulation breakdown when controlling high voltage-low voltage relays according to a driving situation of the car.

SUMMARY

The present invention provides a configuration of a system for a battery of a car for enhancing efficiency and robustness of a system by resolving an unbalance of a charge state among a plurality of battery modules provided in one battery assembly and preventing an insulation breakdown which may instantaneously occur at the time of controlling high voltage-low voltage relays according to a driving situation of the car.

An exemplary embodiment of the present invention provides a system for a battery of a car having an energy storage part configured to include a battery assembly having a first battery module and a second battery module, relays installed between contact points connected with respective terminals of the first battery module and the second battery module and controlling power supply to a driving motor of the car, a converter converting voltage input from the first battery module and the second battery module and supplying the converted voltage to a low-voltage electronic product, an energy storage part connected to an output terminal of the converter, and a battery management system controlling the same.

According to an exemplary embodiment of the present invention, a system for a battery of a car having an energy storage part prevents an instantaneous insulation breakdown which occurs at the time of driving a relay by adding the energy storage part to an LDC output terminal and enables a car operation even in a fail-safe situation such as a failure situation of an LDC to express an effect of enhancing reliability and safety of a car.

DRAWINGS

DETAILED DESCRIPTION

Hereinafter, a configuration and an operation of a system for a battery of a car having an energy storage part according to the present invention will be described in detail with reference to drawings.

However, disclosed drawings are provided as an example for allowing those skilled in the art to sufficiently appreciate the spirit of the present invention. Accordingly, the present invention is not limited to drawings presented below, but may be embodied in other aspects.

Unless otherwise defined, the terms used in the description of the present invention have the same meaning as commonly understood by those skilled in the art to which the present invention belongs and in the following description and the accompanying drawings, a detailed description of known functions and configurations that may unnecessarily blur the gist of the present invention is omitted.

Figure 1:
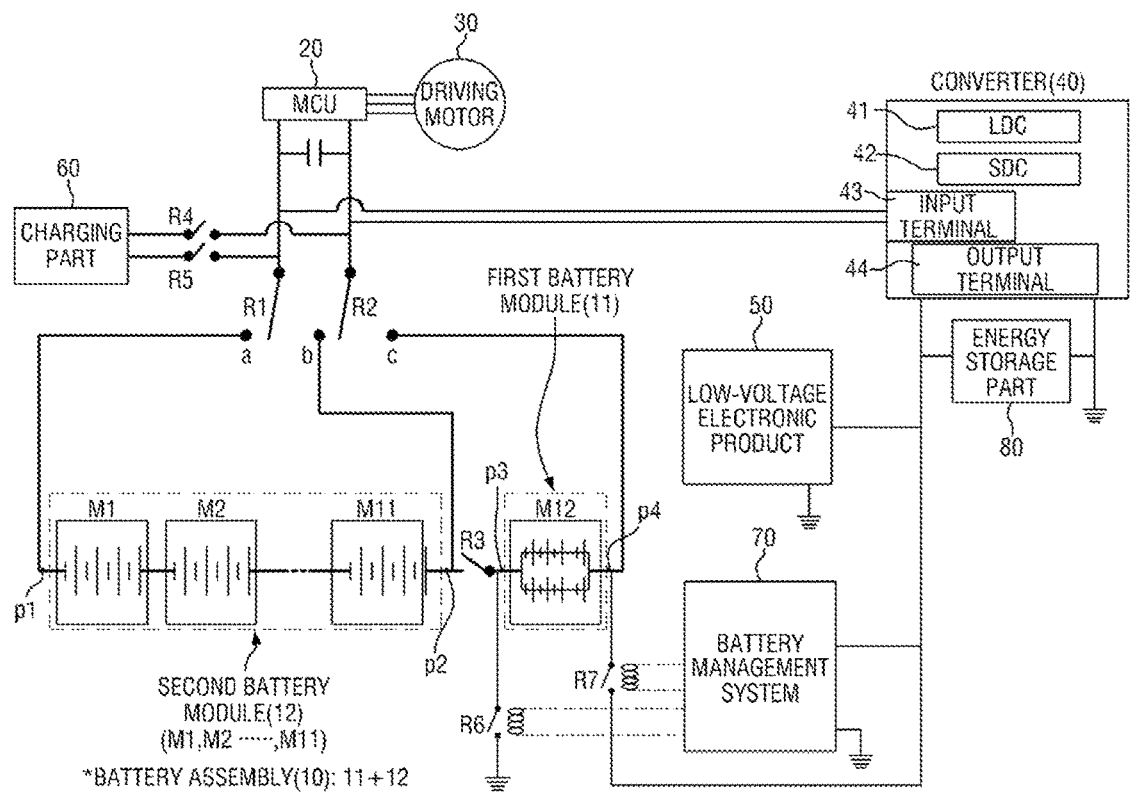
FIG. 1 is a configuration diagram of a system for a battery of a car in one form of the present disclosure.

FIG. 1 is a configuration diagram of a system for a battery of a car in some forms of the present invention.

Referring to FIG. 1, the system for a battery of a car according to an exemplary embodiment of the present invention is configured to include a battery assembly 10 constituted by a plurality of battery modules, a motor control unit (MCU) 20, a driving motor 30, a converter 40, a low-voltage electronic product 50, a charging part 60, a battery management system (BMS) 70, an energy storage part 80, and a plurality of relays R1, R2, R3, R4, R5, R6, and R7.

The battery assembly 10 which has a plurality of battery modules 11 and 12 electrically connected to each other in series has a single packaging form in appearance.

The battery assembly 10 according to the exemplary embodiment of the present invention includes a first battery module 11 and a second battery module 12.

In this case, the first battery module 11 is illustrated as a single battery module, but may be implemented as a plurality of battery modules having the same capacity and connected in series and the second battery module 12 is illustrated as a plurality of battery modules M1 to M11, but may be implemented as the single battery module.

The first battery module 11 as a battery module in which output voltage has a magnitude (e.g., DC 12V) corresponding to power of a low-voltage electronic product load of a car may itself serve as a low-voltage battery and is a battery module having a relatively larger capacity than the second battery module 12.

On the contrary, the second battery module 12 is a battery module in which the output voltage has a magnitude (e.g., DC 200 to 300 V) corresponding to power capable of driving the driving motor 30 of the car.

Here, the capacity of the battery module which means maximum energy which may be stored in the battery module is determined according to the number of battery cells included in the battery module during manufacturing.

When the first battery module 11 is constituted by a plurality of battery modules, the capacities of the respective battery modules are preferably the same as each other and even in the case of the second battery module 12, the capacities of the respective battery modules are preferably the same as each other.

A circuit connection state of the battery system according to the present invention will be described.

First, one contact point p1 of the second battery module 12 is connected to a first contact point a, the other contact point p2 is connected to a second contact point b, and the other contact point p4 of the first battery module 11 is connected to a third contact point c.

A third relay R3 is electrically connected between the other contact point p2 of the second battery module 12 and one contact point p3 of the first battery module 11, and as a result, the other contact point p2 of the second battery module 11 and one contact point p3 of the first battery module 12 are closed or opened according to the operation of a third relay R3.

A first relay R1 is electrically connected between the first contact point a to which one contact point p1 of the second battery module 12 is connected and the second contact point b to which the other contact point p2 is connected, and as a result, a first relay node N1 which is an input terminal of the first relay R1 and the first contact point a are closed to each other and the first relay node N1 and the second contact point b are opened from each other or the first relay node N1 and the first contact point b are opened from each other and the first relay node N1 and the second contact point b are closed to each other according to the operation of the first relay R1.

A second relay R2 is electrically connected between the second contact point b to which the other contact point p2 of the second battery module 12 is connected and the third contact point c to which the other contact point p4 of the first battery module 11 is connected, and as a result, a second relay node N2 which is the input terminal of the second relay R2 and the second contact point b are closed to each other and the second relay node N2 and the third contact point c are opened from each other or the second relay node N2 and the second contact point b are opened from each other and the second relay node N2 and the third contact point c are closed to each other according to the operation of the second relay R2.

When the first relay R1 is not closed to any contact point of the first contact point a and the second contact point b, the first relay node N1 is in a floating state and when the second relay R2 is not closed to any contact point of the third contact point b and the third contact point c, the second relay node N2 is in the floating state.

The first relay node N1 and the second relay node N2 are connected to an inverter (DC-AC converter) 21 converting and supplying battery power to the driving motor 30 driving the car or an input terminal of the motor control unit 20 having the inverter 21, respectively.

A fourth relay R4 is electrically connected between the first relay node N1 and the charging part 60 receiving power from the outside and converting the corresponding power into power for charging the battery and providing the converted power, and as a result, the charging part 60 and the first relay node N1 are closed to or opened from each other according to the operation of the fourth relay R4.

A fifth relay R5 is electrically connected between the second relay node N2 and the charging part 60, and as a result, the charging part 60 and the first relay node N1 are closed to or opened from each other according to the operation of the fifth relay R5.

An input terminal 43 of the converter 40 that converts high-voltage power into low voltage and supplies the converted low voltage to the low-voltage electronic product 50 is connected to each of the first relay node N1 and the second relay node N2.

The converter 40 converts the high voltage applied from the battery assembly 10 into low voltage and supplies the low voltage to the relays R1, R2, R3, R4, R5, R6, and R7 and the low-voltage electronic product 50 as operating power thereof or provides charging voltage for charging the second battery module 12 included in the battery assembly 10.

In this case, the converter 40 according to the exemplary embodiment of the present invention includes a low voltage DC-DC converter (LDC) 41 converting DC high voltage into DC low voltage and a solar DC-DC converter (SDC) 42 converting power supplied from a solar cell installed in the car into the DC low voltage.

A third relay R3 is electrically connected between the other contact point p2 of the second battery module 12 and one contact point p3 of the first battery module 11, and as a result, the other contact point p2 of the second battery module 12 and one contact point p1 of the first battery module 11 are closed to or opened from each other according to the operation of the third relay R3.

A sixth relay R6 is electrically connected between one contact point p3 of the first battery module 11 and a ground GND and a seventh relay R7 is electrically connected between the other contact point p4 of the first battery module 11 and the output terminal of the converter 40.

The sixth relay R6 and the seventh relay R7 are relays for determining electrical connection states of both ends of the first battery module 11 supplying the low-voltage power.

The battery system according to the present invention connects the energy storage part 80 to an output terminal 44 of the converter 40.

The energy storage part 80 may adopt a small battery or capacitor and operates as an auxiliary power source of the battery system according to the present invention to prevent instantaneous insulation breakdown which occurs when driving the relay and perform a fail-safe operation to enable a car operation when the converter 40 is disabled.

The battery system according to the present invention includes a battery management system (BMS) 70 controlling the aforementioned relays R1, R2, R3, R4, R5, R6, and R7, battery assembly 10, motor control unit 20, converter 40, low-voltage electronic product 50, and charging part 60 based on the state of the car.

The battery management system 70 controls the operations of the first to seventh relays R1, R2, R3, R4, R5, R6, and R7 and the energy storage part 80 by considering the state of the car such as whether to start the car, whether to drive the car, charging or not, key-off or not, or supplementary charging or not, and states of charge (SOC) and energy storage amounts of the first battery module 11 and the second battery module 12.

Meanwhile, preferably, the first relay R1, the second relay R2, the third relay R3, the fourth relay R4, and the fifth relay R5 as relays installed on a high-voltage supply line for driving the driving motor 30 of the car adopt a high-voltage specification relay having a high voltage rating, while the sixth relay R6 and the seventh relay R7 as relays controlling both ends of the first battery module 11 having relatively low voltage adopt low-voltage using relays having a low-voltage rating.

Next, an operation of the battery system according to the present invention configured as above will be described as a retrofit method.

1. Operation of Battery System According to the Present Invention in Start Mode

Figure 2:
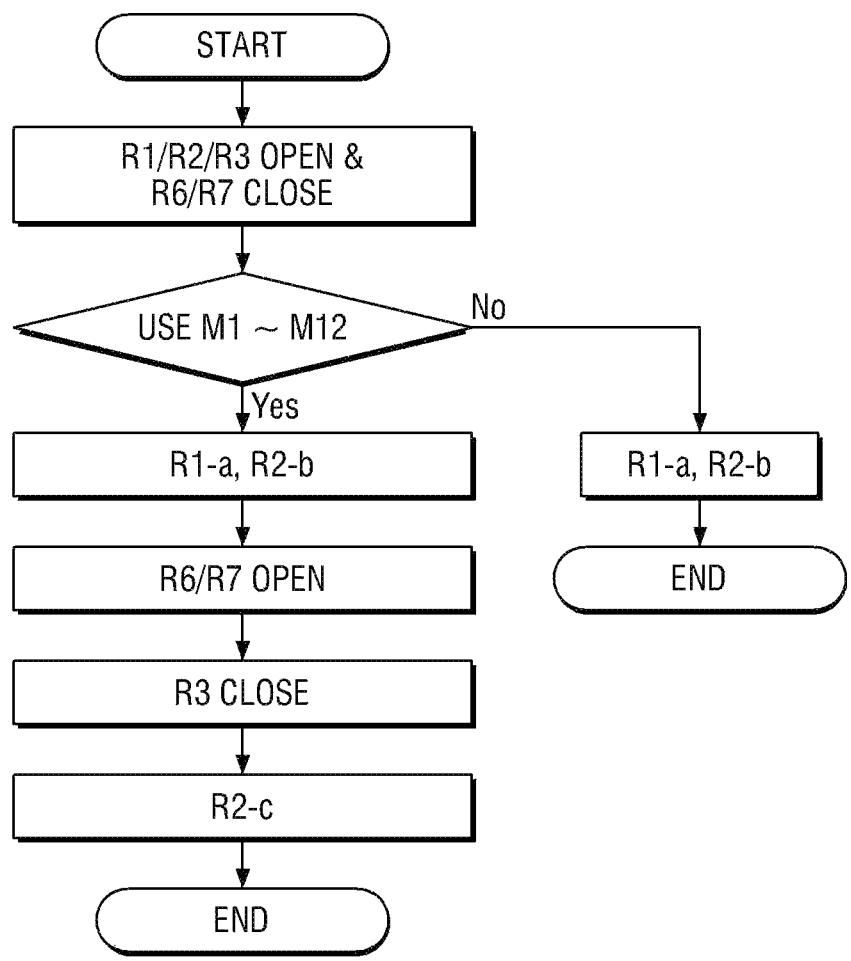
FIG. 2 is a flowchart of an operation of a system for a battery of a car in one form of the present disclosure in a start mode of the car.

FIG. 2 is a flowchart showing an operation of a system for a battery of a car in some forms of the present disclosure in a start mode of a car.

The operation of the car in the start mode represents an operation of the battery system according to the present invention until car driving is started after the car is started from a key-off state in which the car is not started.

First, when the car is in a key-off state (S1), the first relay node N1 and the second relay node N2 of the first relay R1 and the second relay R2 are in a floating state, the third relay R3 is in an opened state between the other contact point p2 of the second battery module 12 and one contact point p3 of the first battery module 11, both ends of each of the sixth relay R6 and the seventh relay R7 are closed and the sixth relay R6 and the seventh relay R7 are in an initial state of closing one contact point p3 of the first battery module 11 and the ground GND and closing the other contact point p4 of the first battery module 11 and the output terminal of the converter 40.

The battery management system 70 determines whether to supply the power by commonly using the first battery module 11 and the second battery module 12 or whether to supply the power by using only the first battery module 11 (S2).

Whether to use the battery modules in step S2 of the exemplary embodiment of the present invention may be determined by determining an energy capacity of the first battery module 11.

That is, the battery management system 70 determines whether the energy capacity of the first battery module 11 is equal to or more than a predetermined reference capacity and when the energy capacity of the first battery module 11 is equal to or more than the reference capacity, the battery management system 70 uses both the first battery module 11 and the second battery module 12 and when the energy capacity of the first battery module 11 is less than the reference capacity, the battery management system 70 uses only the second battery module 12 except for the first battery module 11.

Accordingly, in step S2, since the energy capacity of the first battery module 11 is equal to or more than the predetermined reference capacity, when determining that both the first battery module 11 and the second battery module 12 are used, the battery management system 70 closes the first relay node N1 of the first relay R1 and the first contact point a to each other and closes the second relay node N2 of the second relay R2 and the second contact point b (S3).

In this case, one contact point p1 and the other contact point p2 of the second battery module 12 are connected to the first contact point a and the second contact point b, respectively, while both ends of the third relay R1 are still in the opened state.

Next, the battery management system 70 opens both ends of the sixth relay R6 and the seventh relay R7 (S4) and then, closes both ends of the third relay R3 to close the other contact point p2 of the second battery module 12 and one contact point p3 of the first battery module 11 to each other (S5).

If the third relay R3 is closed while both ends of the sixth relay R6 and the seventh relay R7 are closed to each other, there is a concern that the insulation breakdown will occur between a low-voltage line of the first battery module 11 and a high-voltage line of the second battery module 12 at the moment of closing both ends of the third relay R3, and as a result, both ends of the sixth relay R6 and the seventh relay R7 are opened and then, both ends of the third relay R3 are closed to each other in order to prevent the insulation breakdown.

The battery management system 70 applies the power of the energy storage part 80 to the second relay R2 to close the second relay node N2 of the second relay R2 to the third contact point c (S6), and as a result, the power supplied from the first battery module 11 and the second battery module 12 is applied to the motor control unit 20.

In step S2, since the energy capacity of the first battery module 11 is less than the predetermined reference capacity, when determining that only the second battery module 12 is used, the battery management system 70 closes the first relay node N1 of the first relay R1 and the first contact point a and closes the second relay node N2 of the second relay R2 and the second contact point b (S7) to apply single power of only the second battery module 12 to the motor control unit 20.

Accordingly, when the power is supplied by using both the first battery module 11 and the second battery module 12 by the operation of the battery system according to the present invention in the start mode, both ends of the sixth relay R6 and the seventh relay R7 are opened (S4) and then, a control of closing both ends of the third relay R3 is performed to prevent the concern that the insulation breakdown between the low-voltage line of the first battery module 11 and the high-voltage line of the second battery module 12 will occur.

2. Operation of Battery System According to the Present Invention in Driving Mode FIGS. 3A and 3B are flowcharts of an operation of switching a common use state of a first battery module and a second battery module to a single use state of the second battery module and FIG. 3C is a flowchart of an operation of switching the single use state of the second battery module to the common use state of the first battery module and the second battery module.

The operation of the car in the driving mode represents an operation of the battery system according to the present invention in a state in which the car is started and being driven.

Figure 3A:
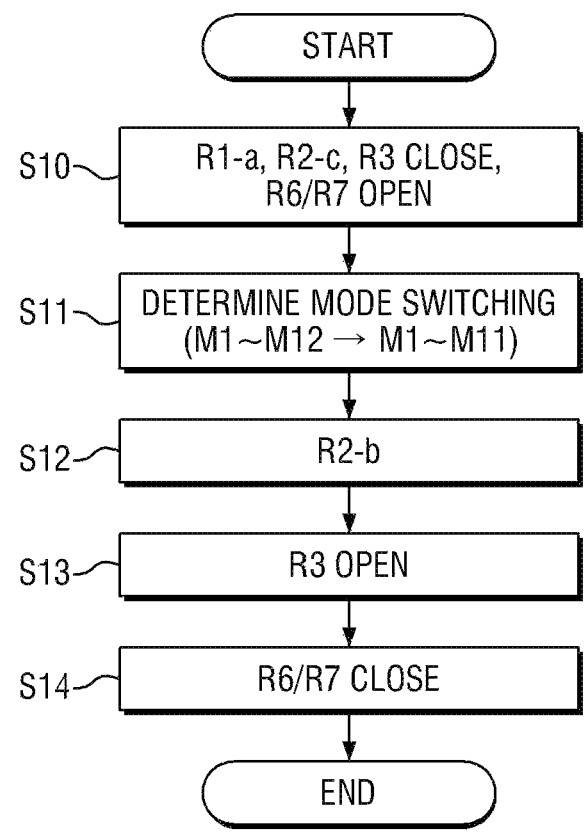
FIGS. 3A and 3B are flowcharts of an operation of switching a common use state of a first battery module and a second battery module to a single use state of the second battery module and FIG. 3C is a flowchart of an operation of switching the single use state of the second battery module to the common use state of the first battery module and the second battery module.
Figure 3B:
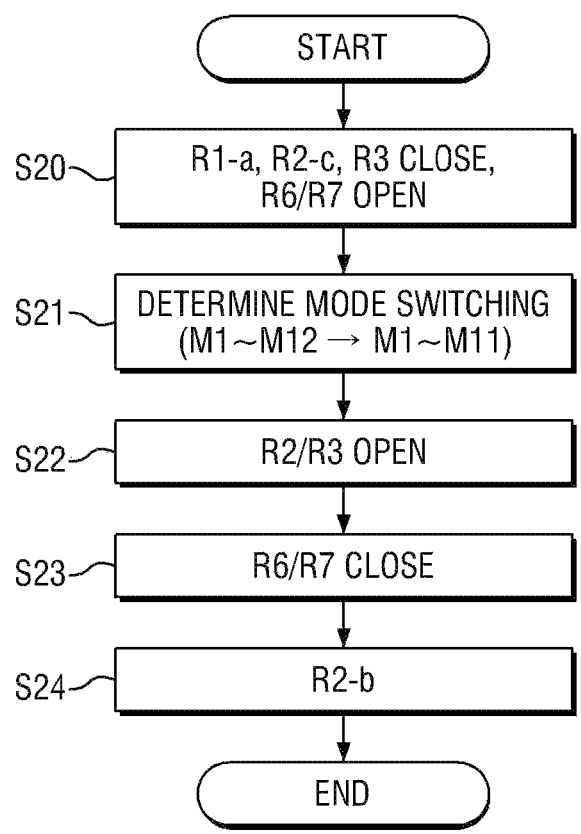
Figure 3C:
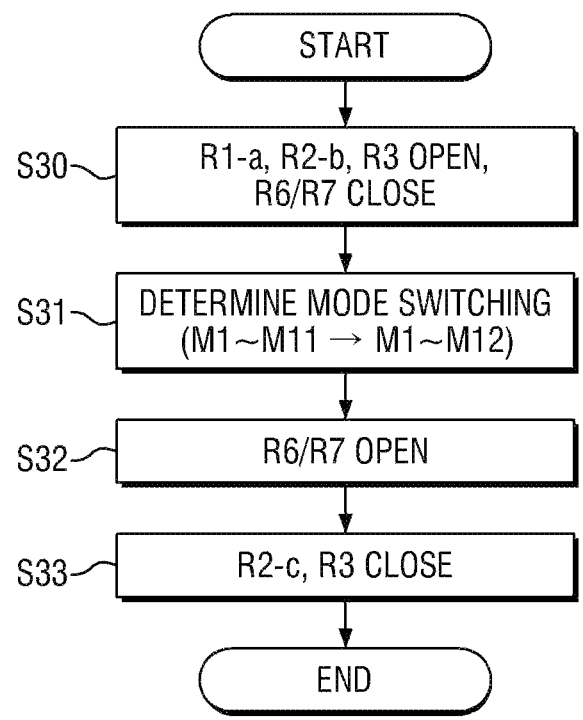

Referring to FIGS. 3A and 3B, exemplary embodiments of an operation of switching a first battery module and second battery module common using state (hereinafter, referred to as a 'module common using state' for convenience of description) to a second battery module alone using state (hereinafter, referred to as a 'second battery module alone using state' for convenience of description) will be described.

The switching of the module common using state to the second battery module alone using state is made in order for the first battery module 11 to supply use voltage of 12 V to the low-voltage electronic product 50 by replacing the converter 40 having a failure as the converter 40 supplying the use voltage of 12 V to the low-voltage electronic product 50 and the battery management system 70 while driving the car has the failure.

In the case of the switching of the module common using state to the second battery module alone using state, when a capacity deviation of the first battery module 11 out of an allowable range occurs, the module common using state is switched to the second battery module alone using state in order to avoid even the use of the second battery module 12 from being restricted.

There are two exemplary embodiments for the switching of the module common using state to the second battery module alone using state according to the present invention and first, referring to FIG. 3A, a first exemplary embodiment will be described.

Referring to FIG. 3A, when the car is driven and in the module common using state, as described with reference to FIG. 2 above, the first relay node N1 of the first relay R1 is closed to the first contact point a, the second relay node N2 of the second relay R2 is closed to the third contact point c, and both ends of the third relay R3 are closed, and as a result, the other contact point p2 of the second battery module 12 and one contact point p3 of the first battery module 11 are closed to each other and both ends of the sixth relay R6 and the seventh relay R7 are opened (S10).

In this state, the battery management system 70 determines whether switching the module common using state to the second battery module alone using state is required during car driving (S11).

The determination for whether the switching is required may be a case where the converter 40 has the failure or a case where the capacity deviation of the first battery module 11 out of the allowable range occurs as described above.

When the switching to the second battery module alone using state is required in step S11, the battery management system 70 operates the second relay R2 by supplying the power of the energy storage part 80 to the second relay R2 to close the second relay node N2 and the second contact point b (S12).

Here, in respect to the reason for using the power of the energy storage part 80, since that there is no power source for operating the relay due to the failure of the converter 40 supplying low voltage, the power possessed by the energy storage part 80 is used.

Next, the battery management system 70 opens both ends of the third relay R3 by operating the third relay R3 (S13) to release the connection between one contact point p3 of the first battery module 11 and the second contact point b, thereby supplying the power of only the second battery module 12 to the motor control unit 20 and ensuring an insulation state between the low-voltage line of the first battery module 11 and the high-voltage line of the second battery module 12.

Here, when the second relay R2 is operated, relay operation power supplied by the energy storage part 80 is required to close the second relay node N2 and the second contact point b, but when the third relay R3 is opened, voltage applied to both ends of the third relay R3 is just released, and as a result, separate relay operation power is not required.

Thereafter, the battery management system 70 closes both ends of the sixth relay R6 and the seventh relay R7 which are in the opened state, respectively (S14) to drive the low-voltage electronic product 50 by supplying the power of the first battery module 11 to the low-voltage electronic product 50.

Next, referring to FIG. 3B, a second exemplary embodiment of the switching of the module common using state to the second battery module alone using state according to the present invention will be described.

First, in the switching of the module common using state to the second battery module alone using state described by referring to FIG. 3B, the module common using state is switched to the second battery module alone using state in the case where the converter 40 has the failure or the case where the capacity deviation of the first battery module 11 out of the allowable range occurs similarly in the first exemplary embodiment.

Referring to FIG. 3B, when the car is driven and in the module common using state, as in the first exemplary embodiment, the first relay node N1 of the first relay R1 is closed to the first contact point a, the second relay node N2 of the second relay R2 is closed to the third contact point c, and both ends of the third relay R3 are closed, and as a result, the other contact point p2 of the second battery module 12 and one contact point p3 of the first battery module 11 are closed to each other and both ends of the sixth relay R6 and the seventh relay R7 are opened (S20).

In this state, the battery management system 70 determines whether switching the module common using state to the second battery module alone using state is required during car driving (S21).

The determination for whether the switching is required may be the case where the converter 40 has the failure or the case where the capacity deviation of the first battery module 11 out of the allowable range occurs as described above.

When the switching to the second battery module alone using state is required in step S21, the battery management system 70 opens both ends by releasing a closing state of the second relay node N2 of the second relay R2 and the third contact point c and opens both ends of the third relay R3 (S22) to release the connection between one contact point p3 of the first battery module 11 and the second contact point b.

The battery management system 70 supplies the power of the energy storage part 80 to the sixth relay R6 and the seventh relay R7 to close both ends of the sixth relay R6 and the seventh relay R7 which are in the opened state, respectively (S23).

In respect to the reason for using the power of the energy storage part 80, since that there is no power source for operating the relay due to the failure of the converter 40 supplying low voltage, the power possessed by the energy storage part 80 is used.

Next, the battery management system 70 operates the second relay R2 by supplying the power to the second relay R2 to close the second relay node N2 of the second relay R2 and the second contact point b (S24), thereby supplying the power of only the second battery module 12 to the motor control unit 20 and ensuring the insulation state between the low-voltage line of the first battery module 11 and the high-voltage line of the second battery module 12.

In the second exemplary embodiment of the switching of the module common using state to the second battery module alone using state according to the present invention, which operates as above, which operates as described as an exemplary embodiment of operating the sixth relay R6 and the seventh relay R7 which operate with relatively low voltage by using the power of the energy storage part 80, a small-capacity energy storage unit of the energy storage part 80 may be configured, while compared with the first exemplary embodiment, the second relay node N2 of the second relay R2 and the second contact point b are closed at a later timing, and as a result, a timing of supplying the power of only the second battery module 12 to the motor control unit 20 is relatively delayed compared to the first exemplary embodiment.

Next, an operation of switching the second battery module alone using state to the module common using state of the first battery module and the second battery module will be described with reference to FIG. 3C.

First, in the switching of the second battery module alone using state to the module common using state described with reference to FIG. 3C, in a case where the failure of the converter 40 which occurs in the exemplary embodiments described with reference to FIGS. 3A and 3B occurs, but thereafter, the failure of the converter 40 is released and the converter 40 normally operates again or in a case where capacity balancing of the energy capacity of the first battery module 11 is completed and the capacity deviation of the first battery module 11 returns within the allowable range, the second battery module alone using state is switched to the module common using state of the first battery module 11 and the second battery module 12.

Referring to FIG. 3C, when the car is driven and in the second battery module alone using state, as described in the exemplary embodiment, the first relay node N1 of the first relay R1 is closed to the first contact point a (referring to the operations in step S10 and S20), the second relay node N2 of the second relay R2 is closed to the second contact point b (referring to the operations in steps S12 and S23), both ends of the third relay R3 are in the opened state (referring to the operations in steps S13 and S22), and both ends of the sixth relay R6 and the seventh relay R7 are in the closed state (referring to the operations in steps S14 and S23) (S30).

In this state, the battery management system 70 determines whether the switching of the second battery module alone using state to the module common using state is required during the car driving (S31).

Whether the switching is required may be determined in the case where the failure of the converter 40 is released and the converter 40 normally operates or the case where the capacity balancing of the energy capacity of the first battery module 11 is completed and the capacity deviation of the first battery module 11 returns within the allowable range as described above.

When the switching to the module common using state is required in step S31, in order to prevent the concern that the insulation breakdown between the low-voltage line of the first battery module 11 and the high-voltage line of the second battery module 12 will occur, the battery management system 70 opens both ends of the sixth relay R6 and the seventh relay R7 (S32) and then, closes the second relay node N2 to the third contact point c by applying the power of the energy storage part 80 to the second relay R2 and closes both ends of the third relay R3 by applying the power of the energy storage part 80 to the third relay R3 to close the other contact point p2 of the second battery module 12 and one contact point p3 of the first battery module 11 to each other (S33).

Here, the reason why the battery management system 70 first performs opening both ends of the sixth relay R6 and the seventh relay R7 in step S32 is that if the third relay R3 is closed while both ends of the sixth relay R6 and the seventh relay R7 are closed to each other, there is a concern that the insulation breakdown will occur between the low-voltage line of the first battery module 11 and the high-voltage line of the second battery module 12 at the moment of closing both ends of the third relay R3.

Accordingly, according to the aforementioned operation, when the switching to the module common using state is required, the second battery module alone using state is switched to the module common using state of the first battery module and the second battery module.

Meanwhile, the operation of the capacity balancing for the energy capacity of the first battery module 11 will be described below.

The capacity balancing of the first battery module 11 indicates that the energy storage amounts of the first battery module 11 and the second battery module 12 are compared with each other and the first battery module 11 and the second battery module 12 operate so that a difference between the energy storage amounts becomes a predetermined reference value.

Specifically, the battery management system 70 determines whether a value acquired by subtracting the energy storage amount of the second battery module 12 from the energy storage amount of the first battery module 11 is equal to a predetermined energy storage amount reference value A and terminates the operation of the capacity balancing when the value acquired by subtracting the energy storage amount of the second battery module 12 from the energy storage amount of the first battery module 11 is equal to the predetermined energy storage amount reference value A.

However, when the value acquired by subtracting the energy storage amount of the second battery module 12 from the energy storage amount of the first battery module 11 is smaller than the predetermined energy storage amount reference value A, the battery management system 70 closes the first relay node N1 of the first relay R1 to the first contact point a and closes the second relay node N2 of the second relay R2 to the second contact point b, and closes both the sixth relay R6 and the seventh relay R7, and as a result, the converter 40 charges the first battery module 11 by using energy stored in the second battery module 12. The first battery module 11 is charged until the value acquired by subtracting the energy storage amount of the second battery module 12 from the energy storage amount of the first battery module 11 is equal to the energy storage amount reference value A. Here, since the first battery module 11 has a larger capacity than an individual battery module which the second battery module 12 has in order to operate as the high-voltage battery together with the second battery module 12 included in the battery assembly 10 and itself operate as the low-voltage battery for driving the low-voltage electronic product 50, it is preferable that a capacity difference between both battery modules is constantly maintained during a battery operation process and the energy storage amount reference value A is set by considering such a point.

On the contrary, when the value acquired by subtracting the energy storage amount of the second battery module 12 from the energy storage amount of the first battery module 11 is more than the predetermined energy storage amount reference value A, the battery management system 70 may perform an operation of consuming the energy stored in the first battery module 11 and as an example, passively balance and discharge the first battery module 11. Thereafter, since the battery management unit 70 repeatedly performs determining whether the value acquired by subtracting the energy storage amount of the second battery module 12 from the energy storage amount of the first battery module 11 is equal to the predetermined energy storage amount reference value A after performing the process of consuming the energy stored in the first battery module 11, a difference between the energy stored in the first battery module 11 and the energy stored in the second battery module 12 is eventually substantially equal to the predetermined energy storage amount reference value A.

3. Operation of Battery System According to the Present Invention in External Charging Mode The external charging mode is an operation of commonly charging the first battery module 11 and the second battery module 12 by the power of a solar DC-DC converter (SDC) 42 converting power of the charging part 60 or a solar cell installed in the car into DC low voltage or an operation of individually charging the first battery module 11 and the second battery module 12, respectively.

The car operates separately in a case where the battery module is externally charged in the key off state of the car and in a case where the battery module is externally charged in a start state (ST situation) of the car.

Figure 4:
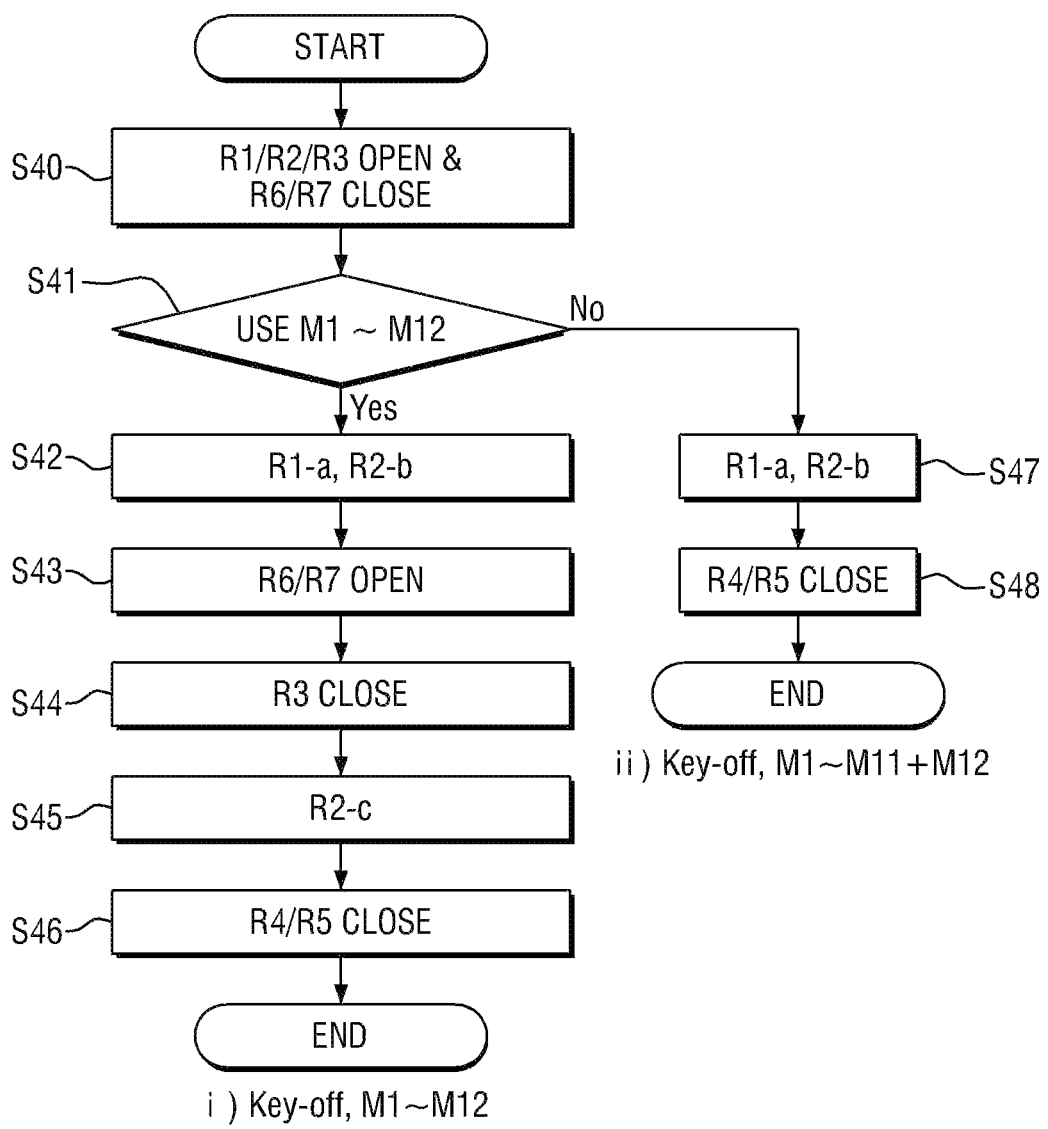
FIG. 4 is a flowchart of an operation of a system for a battery of a car in one form of the present disclosure in an external charge mode of a car.

First, the case where the battery module is externally charged in the key-off state is described. FIG. 4 is a flowchart showing an operation of a system for a battery of a car according to the present invention in an external charging mode of a car.

Referring to FIG. 4, in the key-off state of the car, the first relay node N1 and the second relay node N2 of the first relay R1 and the second relay R2 are in a floating state, the third relay R3 is in an opened state between the other contact point p2 of the second battery module 12 and one contact point p3 of the first battery module 11, both ends of each of the sixth relay R6 and the seventh relay R7 are closed and the seventh relay R6 and the seventh relay R7 are in an initial state of closing one contact point p3 of the first battery module 11 and the ground GND and closing the other contact point p4 of the first battery module 11 and the output terminal of the converter 40 (S40).

The battery management system 70 determines whether to perform an operation (hereinafter, referred to as a 'module common charging operation' for convenience description) of commonly charging the first battery module 11 and the second battery module 12 or whether to perform an operation (hereinafter, referred to as a 'module individual charging operation' for convenience of description) of individually charging the first battery module 11 and the second battery module 12, respectively (S41).

Whether to perform the module common charging or the module individual charging in step S41 of the exemplary embodiment of the present invention may be determined by determining the energy capacity of the first battery module 11.

That is, the battery management system 70 determines whether the energy capacity of the first battery module 11 is equal to or more than a predetermined charging reference capacity and when the energy capacity of the first battery module 11 is equal to or more than the charging reference capacity, the energy capacity of the first battery module 11 is sufficient, and as a result, the first battery module 11 need not be individually charged, such that the battery management system 70 performs the module common charging operation of commonly charging the first battery module 11 and the second battery module 12 and when the energy capacity of the first battery module 11 is less than the charging reference capacity, the energy capacity of the first battery module 11 is insufficient, and as a result, the first battery module 11 need not be individually charged, such that the battery management system 70 performs the module individual charging operation of individually charging the first battery module 11 and the second battery module 12, respectively.

Accordingly, in step S41, since the energy capacity of the first battery module 11 is equal to or more than the predetermined charging reference capacity, when it is determined that the module common charging operation is performed, the battery management system 70 closes the first relay node N1 of the first relay R1 and the first contact point a to each other and closes the second relay node N2 of the second relay R2 and the second contact point b (S42).

In this case, one contact point p1 and the other contact point p2 of the second battery module 12 are connected to the first contact point a and the second contact point b, respectively, while both ends of the third relay R1 is still in the opened state.

Next, the battery management system 70 opens both ends of the sixth relay R6 and the seventh relay R7 (S43) and then, closes both ends of the third relay R3 to close the other contact point p2 of the second battery module 12 and one contact point p3 of the first battery module 11 to each other (S44).

As described above, if the third relay R3 is closed while both ends of the sixth relay R6 and the seventh relay R7 are closed to each other, there is a concern that the insulation breakdown will occur between a low-voltage line of the first battery module 11 and a high-voltage line of the second battery module 12 at the moment of closing both ends of the third relay R3, and as a result, both ends of the sixth relay R6 and the seventh relay R7 are opened and then, both ends of the third relay R3 are closed to each other in order to prevent the insulation breakdown.

The battery management system 70 applies the power of the energy storage part 80 to the second relay R2 to close the second relay node N2 of the second relay R2 to the third contact point c (S45), and as a result, the power supplied from the first battery module 11 and the second battery module 12 may be applied to the motor control unit 20 and closes both ends of the fourth relay R4 and the fifth relay R5 connected with the charging part 60 (S46) to charge the first battery module 11 and the second battery module 12 by external power applied through the charging part 60.

Since the energy capacity of the first battery module 11 is less than the predetermined charging reference capacity in step S41, when it is determined that the battery management system 70 performs the operation of individually charging the first battery module 11 and the second battery module 12, respectively, the battery management system 70 closes the first relay node N1 of the first relay R1 and the first contact point a and closes the second relay node N2 of the second relay R2 and the second contact point b (S47), and closes both ends of the fourth relay R4 and the fifth relay R5 connected with the charging part 60 (S48) and supplies the external power applied through the charging part 60 to the second battery module 12 and charges the second battery module 12 and supplies the external power applied through the charging part 60 to the first battery module 11 through the sixth relay R6 and the seventh relay R7 of which both ends are closed through the converter 40 and charges the first battery module 11.

Next, the operation of the system for a battery of a car according to the present invention in the case of the external charging in the start state (ST situation) of the car will be described.

First, the operation of commonly charging the first battery module 11 and the second battery module 12 in the start state (ST situation) of the car will be described.

Steps S1 to S6 described by referring to FIG. 2 described above are performed, the first relay node N1 of the first relay R1 is closed to the first contact point a, the second relay node N2 of the second relay R2 is closed to the third contact point c, and both ends of the third relay R3 are closed, and as a result, the other contact point p2 of the second battery module 12 and one contact point p3 of the first battery module 11 are closed to each other and both ends of the sixth relay R6 and the seventh relay R7 are opened.

The battery management system 70 charges the first battery module 11 and the second battery module 12 by the external power applied through the charging part 60 by closing both ends of the fourth relay R4 and the fifth relay R5 connected with the charging part 60.

Next, the operation of individually charging the first battery module 11 and the second battery module 12 in the start state (ST situation) of the car will be described.

Steps S10 to S14 or steps S20 to S24 described with reference to FIGS. 3A and 3B described above are performed, and as a result, when the module common using state of the first battery module 11 and the second battery module 12 is switched to the second battery module alone using state of only the second battery module 12, the first relay node N1 of the first relay R1 is closed to the first contact point a, the second relay node N2 of the second relay R2 is closed to the second contact point b, and both ends of the third relay R3 are opened, and as a result, the other contact point p2 of the second battery module 12 and one contact point p3 of the first battery module 11 are opened to each other and both ends of the sixth relay R6 and the seventh relay R7 are closed to each other, respectively.

When the battery management system 70 closes both ends of the fourth relay R4 and the fifth relay R5 connected with the charging part 60 to each other in such a state, the battery management system 70 supplies the external power applied through the charting part 60 to the second battery module 12 to charge the second battery module 12 and supplies the external power applied through the charging part 60 to the first battery module 11 through the sixth relay R6 and the seventh relay R7 of which both ends are closed through the converter 40 to charge the first battery module 11.

Figure 5A:
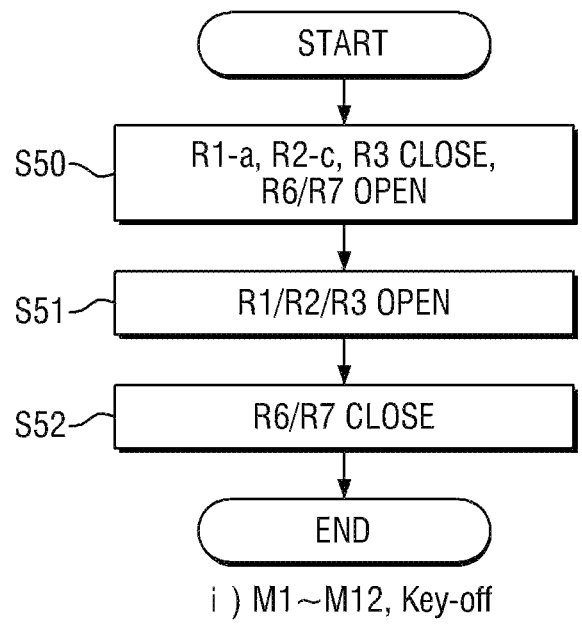
FIG. 5A is a flowchart of an operation of switching a common use state of a first battery module and a second battery module to the key-off state and FIG. 5B is a flowchart of an operation of switching the single use state of the second battery module to the key-off state.
Figure 5B:
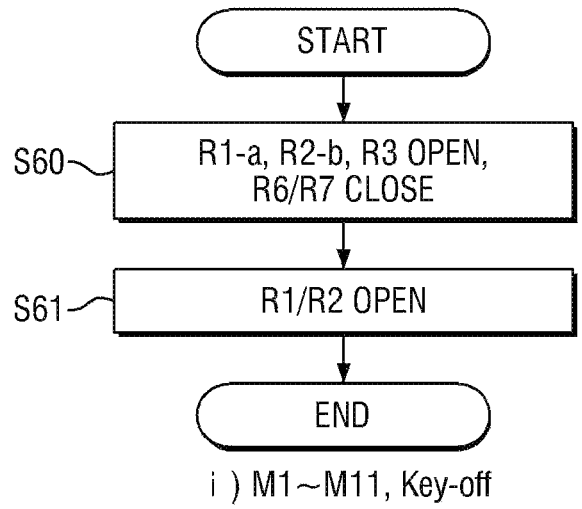
Figure 6:
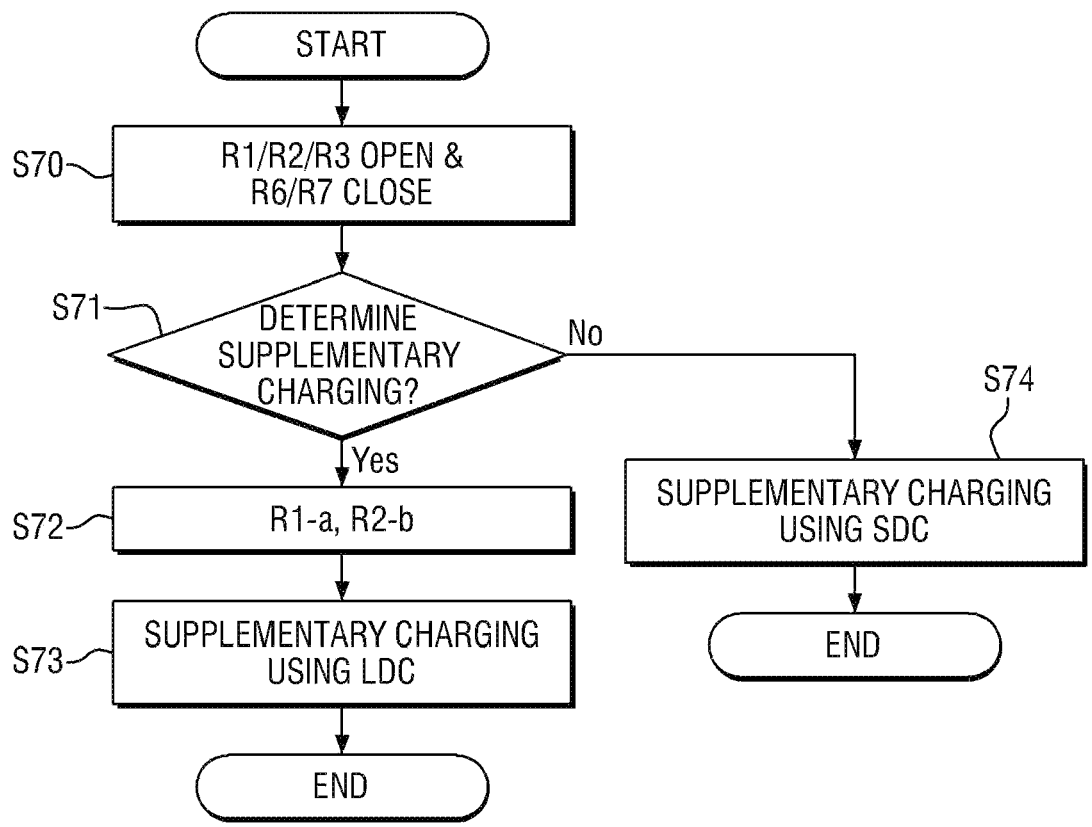
FIG. 6 is a flowchart of an operation of a system for a battery of a car in one form of the present disclosure in a car supplementary charging mode.

4. Operation of Battery System According to the Present Invention in Key-Off Switching Mode The key-off switching mode is a mode to switch a driving or external charging mode of the car to the key-off state, and FIG. 5A is a flowchart of an operation of switching a common use state of a first battery module and a second battery module to the key-off state and FIG. 5B is a flowchart of an operation of switching the single use state of the second battery module to the key-off state.

First, referring to FIG. 5A, an operation of switching the first battery module and second battery module common using state to the key-off state will be described.

In a state of commonly using the first battery module 11 and the second battery module 12 during the driving of the car or in the external charging mode of the car, steps S1 to S6 described in the operation of the battery system according to the present invention in the start mode or steps S40 to S46 in the external charging mode are performed, and as a result, the first relay node N1 of the first relay R1 is closed to the first contact point a, the second relay node N2 of the second relay R2 is closed to the third contact point c, and both ends of the third relay R3 are closed, and as a result, the other contact point p2 of the second battery module 12 and one contact point p3 of the first battery module 11 are closed to each other and both ends of the sixth relay R6 and the seventh relay R7 are opened, respectively (S50).

Next, the battery management system 70 switches the first relay node N1 of the first relay R1 and the second relay node N2 of the second relay to the floating state and opens both ends of the third relay R3 to open the other contact point p2 of the second battery module 12 and one contact point p3 of the first battery module 11 to each other (S51).

The reason is that supplying the low-voltage power by the first battery module 11 is required in the key-off state and since there is a concern that the insulation breakdown between the low-voltage line of the first battery module 11 and the converter 40 during switching to the key-off state, respective nodes N1 and N2 of the first relay R1 and the second relay R2 are switched to the floating state in order to prevent the insulation breakdown and both ends of the third relay R3 are opened to interrupt supplying the low-voltage power through the converter 40.

Next, in order to perform the low-voltage power supply by the converter 40, the battery management system 70 supplies the power of the energy storage part 80 to the sixth relay R6 and the seventh relay R7 to close both ends of the sixth relay R6 and the seventh relay R7 (S52) and in this case, the common using state is switched to the key-off state in a situation in which the low-voltage power is supplied by the low voltage of the first battery module 11.

Next, referring to FIG. 5B, the operation of switching the second battery module alone using state to the key-off state will be described.

In a state of using only the second battery module 12 alone while driving the car, steps S1, S2, and S7 described in the operation of the battery system according to the present invention in the start mode are performed, and as a result, the first relay node N1 of the first relay R1 is closed to the first contact point a, the second relay node N2 of the second relay R2 is closed to the second contact point b, and both ends of the third relay R3 are opened, and as a result, the other contact point p2 of the second battery module 12 and one contact point p3 of the first battery module 11 are opened and both ends of the sixth relay R6 and the seventh relay R7 are closed, respectively (S60).

In such a state, in order to perform the low-voltage power supply by the converter 40, the battery management system 70 switches the first relay node N1 of the first relay R1 and the second relay node N2 of the second relay to the floating state (S61).

In this case, in a situation in which both ends of the third relay R3 are opened while high-voltage power supply by the second battery module 12 is stopped and the low-voltage power is supplied by the low voltage of the first battery module 11 while both ends of the sixth relay R6 and the seventh relay R7 are switched to the state in which both ends are closed, the second battery module alone using state is switched to the key-off state.

5. Operation of Battery System According to the Present Invention in Supplementary Charging Mode Last, the operation of the battery system according to the present invention in the supplementary charging mode will be described.

The supplementary charging mode is a mode to charge the first battery module 11 by supplying the high-voltage power of the second battery module 12 to the converter 40 or charge the first battery module 11 by using the power solar DC-DC converter (SDC) 42 converting power supplied from a solar cell installed in the car of the converter 40 into DC low voltage when the capacity of the first battery module 11 is equal to or less than a predetermined level in the key-off situation of the car.

First, in the key-off situation of the car, steps S50 to S52 described in the key-off switching mode are performed, and as a result, the first relay node N1 of the first relay R1 and the second relay node N2 of the second relay are in the floating state, both ends of the third relay R3 are opened, and both ends of the sixth relay R6 and the seventh relay R7 are closed to supply the low voltage power by the low voltage of the first battery module 11 (S70).

The battery management system 70 determines whether the energy capacity of the first battery module 11 is equal to or less than the predetermined level (S71).

In step S71, when the energy capacity of the first battery module 11 is equal to or less than the predetermined level, the battery management system 70 determines that supplementary charging of the first battery module 11 is required, closes the first relay node N1 of the first relay R1 and the first contact point a to each other, and closes the second relay node N2 of the second relay R2 and the second contact point b (S72).

Then, the high-voltage power applied from the second battery module 12 is supplied to the converter 40 and the low-voltage power is supplied to the first battery module 11 from the converter 40 to supplementarily charge the first battery module 11 (S73) and in particular, the low-voltage power converted by a low voltage DC-DC converter (LDC) 41 converting the DC high voltage of the converter 40 into the DC low voltage is supplied to the first battery module 11.

On the contrary, when the energy capacity of the first battery module 11 is not equal to or less than the predetermined level in step S71, the first battery module 11 is supplementarily charged with the low-voltage power supplied by the solar DC-DC converter (SDC) 42 converting the power supplied from the solar cell embedded in the converter 40 into the DC low voltage without driving the relays (S74).

Figure 7:
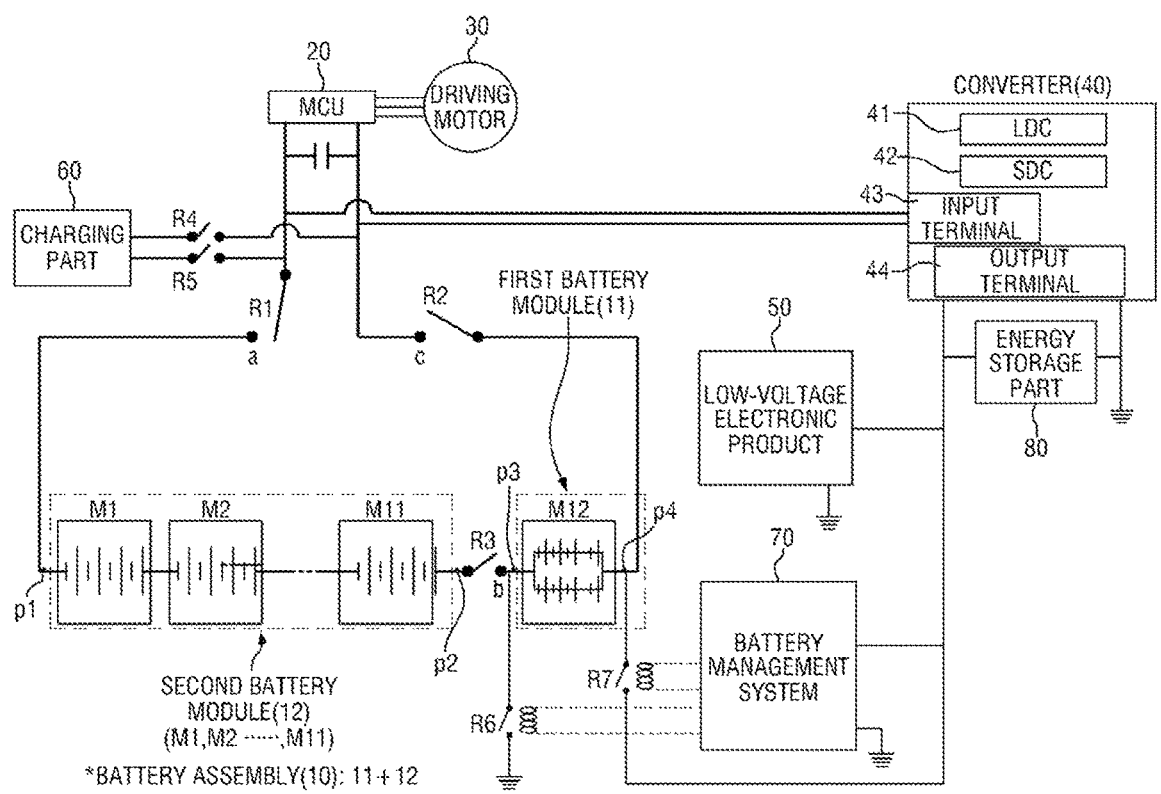
FIG. 7 is a configuration diagram of a system for a battery of a car in one form of the present disclosure.

Meanwhile, FIG. 7 is a configuration diagram of a system for a battery of a car according to another exemplary embodiment of the present invention. The system for a battery of a car according to another exemplary embodiment of the present invention illustrated is an exemplary embodiment in which only a position of the second relay R2 is changed as compared with the aforementioned exemplary embodiment and the operation of the corresponding another exemplary embodiment is the same as the operation of the aforementioned exemplary embodiment, therefore, a detailed description thereof is omitted.

What is claimed is:

1. A system for a battery of a car, the system comprising:
   a battery assembly including at least one first battery module and at least one second battery module;
   a first relay in which a first relay node is electrically connected between a first contact point to which a first point of the second battery module is connected and a second contact point to which a second point of the second battery module is connected, the first relay configured to control closing and opening between the first relay node and the first contact point and to control closing and opening between the first relay node and the second contact point;
   a second relay in which a second relay node is electrically connected between the second contact point and a third contact point to which a first point of the first battery module is connected, the second relay configured to control closing and opening between the second relay node and the second contact point and to control closing and opening between the second relay node and the third contact point;
   a third relay electrically connected between the second point of the second battery module and a second point of the first battery module, the third relay configured to control closing and opening between the second point of the second battery module and the second point of the first battery module;
   a converter configured to:
     convert voltage input through an input terminal connected to the first relay node and the second relay node; and
     supply the converted voltage to a low-voltage electronic product through an output terminal;
   a sixth relay configured to control between the second point of the first battery module and the output terminal;
   a seventh relay configured to control between the first point of the first battery module and the output terminal;
   an energy storage part connected to the output terminal; and
   a battery management system configured to control the first relay, the second relay, the third relay, the sixth relay, and the seventh relay, and the energy storage part according to a driving condition of the car and energy storage amounts of the first battery module and the second battery module.

2. The system of claim 1, wherein the first relay node and the second relay node are connected to an inverter, the inverter configured to convert and supply battery power to a driving motor or an input terminal of a motor control unit having the inverter, respectively.

3. The system of claim 1, wherein the battery management system is configured to:
   perform a start mode control until a driving start from a key-off state of the car;
   determine whether to use the first battery module and the second battery module or whether to use only the first battery module in the key-off state of the car;
   when it is determined that both the first battery module and the second battery module are used, close the first relay node of the first relay and the first contact point and close the second relay node of the second relay and the second contact point;
   open both ends of the sixth relay and the seventh relay;
   close both ends of the third relay to close the second point of the second battery module and the second point of the first battery module;
   apply the power of the energy storage part to the second relay to close the second relay node of the second relay to the third contact point; and
   apply the power supplied from the first battery module and the second battery module to the motor control unit.

4. The system of claim 3, wherein, when it is determined that only the second battery module is used, the battery management system is configured to:
- close the first relay node of the first relay and the first contact point;
- close the second relay node of the second relay and the second contact point; and
- apply single power of only the second battery module to the motor control unit.

5. The system of claim 3, wherein, when determining whether to use the first battery module and the second battery module, the battery management system is configured to:
- determine whether the energy capacity of the first battery module is equal to or greater than a predetermined reference capacity;
- when the energy capacity of the first battery module is equal to or greater than the predetermined reference capacity, use both the first battery module and the second battery module; and
- when the energy capacity of the first battery module is less than the predetermined reference capacity, use only the second battery module.

6. The system of claim 1, wherein the battery management system is configured to:
- perform a driving mode control of switching a common using state of the first battery module and the second battery module to a single using state of the second battery module while the car is driven;
- when the first relay node of the first relay is closed to the first contact point, determine whether switching the common using state of the first battery module and the second battery module to the second battery module alone using state is required;
- when it is determined that the switching to the second battery module alone using state is required, supply the power of the energy storage part to the second relay to close the second relay node and the second contact point;
- open both ends of the third relay;
- close both ends of the sixth relay and the seventh relay; and
- supply the power of only the second battery module to the motor control unit and supply the power of the first battery module to the low-voltage electronic product to drive the low-voltage electronic product.

7. The system of claim 1, wherein the battery management system is configured to:
- perform a driving mode control of switching a common using state of the first battery module and the second battery module to a single using state of the second battery module while the car is driven;
- when the first relay node of the first relay is closed to the first contact point, determine whether switching the module common using state to the second battery module alone using state is required;
- when it is determined that the switching to the second battery module alone using state is required, open the second relay node of the second relay and the third contact point and open both ends of the third relay;
- close both ends of the sixth relay and the seventh relay by supplying the power of the energy storage part to the sixth relay and the seventh relay;
- close the second relay node of the second relay and the second contact point;
- supply the power of only the second battery module to the motor control unit; and
- supply the power of the first battery module to the low-voltage electronic product to drive the low-voltage electronic product.

8. The system of claim 6, wherein determining whether the switching the common using state of the first battery module and the second battery module to the second battery module alone using state is required comprises:
- when the converter has a failure or a capacity deviation of the first battery module out of an allowable range occurs, determine that the switching the common using state to the second battery module alone using state is required.

9. The system of claim 1, wherein the battery management system is configured to:
- perform a driving mode control of switching the second battery module alone using state to the module common using state of the first battery module and the second battery module while the car is driven;
- when the first relay node of the first relay is closed to the first contact point, and the second relay node of the second relay is closed to the second contact point, open both ends of the third relay, and close both ends of the sixth relay and the seventh relay;
- determine whether the switching of the second battery module alone using state to the module common using state is required;
- when it is determined that the switching to the module common using state is required, open both ends of the sixth relay and the seventh relay;
- close the second relay node and the third contact point by applying the power of the energy storage part to the second relay;
- close both ends of the third relay by applying the power of the energy storage part to the third relay; and
- apply the power supplied from the first battery module and the second battery module to the motor control unit.

10. The system of claim 9, wherein determining whether the switching of the second battery module alone using state to the module common using state is required comprises:
- when the failure of the converter is released and the converter normally operates or when capacity balancing of the energy capacity of the first battery module is completed and the capacity deviation of the first battery module returns within the allowable range, determine that the switching to the module common using state of the first battery module and the second battery module is required.

11. The system of claim 1, further comprising:
- a charging part configured to:
  - receive power from outside; and
  - convert the received power into power for battery charging and provide the converted power;
- a fourth relay connected between the charging part and the first relay node, the fourth relay configured to control between the charging part and the first relay node; and
- a fifth relay connected between the charging part and the second relay node, the fifth relay configured to control between the charging part and the second relay node,
- wherein the battery management system is configured to:
  - perform a control of an external charging mode of commonly charging the first battery module and the second battery module by the power supplied from the charging part;
  - determine whether to perform an operation of commonly charging the first battery module and the second battery module or whether to perform an operation of individually charging the first battery module and the second battery module, respectively, in the key-off state of the car;

when it is determined that a module common charging operation of commonly charging the first battery module and the second battery module is performed, close the first relay node of the first relay and the first contact point and close the second relay node of the second relay and the second contact point;

open both ends of the sixth relay and the seventh relay close both ends of the third relay to close the second point of the second battery module and the second point of the first battery module;

apply the power of the energy storage part to the second relay to close the second relay node of the second relay to the third contact point; and close both ends of the fourth relay and the fifth relay to charge the first battery module and the second battery module by the power provided from the charging part.

12. The system of claim 11, wherein, when it is determined that the operation of individually charging the first battery module and the second battery module is performed, the battery management system is configured to:

close the first relay node of the first relay and the first contact point;

close the second relay node of the second relay and the second contact point;

close both ends of the fourth relay and the fifth relay;

charge the second battery module by the power provided from the charging part; and supply the power provided from the charging part to the first battery module from the converter through the sixth relay and the seventh relay to charge the first battery module.

13. The system of claim 11, wherein when determining whether module common charging or module individual charging is performed, the battery management system is configured to:

determine whether the energy capacity of the first battery module is equal to or greater than a predetermined charging reference capacity;

commonly charge the first battery module and the second battery module when it is determined that the energy capacity is equal to or greater than the charging reference capacity; and individually charge each of the first battery module and the second battery module when it is determined that the energy capacity is less than the charging reference capacity.

14. The system of claim 1, wherein the battery management system is configured to:

perform a key-off switching mode control of switching the first battery module and second battery module common using state to the key-off state when driving or charging the car;

when both ends of the sixth relay and the seventh relay are opened, respectively, switch the first relay node of the first relay and the second relay node of the second relay to a floating state and open both ends of the third relay;

supply the power of the energy storage part to the sixth relay and the seventh relay to close both ends of the sixth relay and the seventh relay; and switch the common using state to the key-off state when the low-voltage power is supplied by the low voltage of the first battery module.

15. The system of claim 1, wherein the battery management system is configured to:

perform a key-off switching mode control of switching the second battery module alone using state to the key-off state when driving or charging the car;

when both ends of the third relay are opened and the second point of the second battery module and the second point of the first battery module are opened, and both ends of the sixth relay and the seventh relay are closed, respectively, switch the first relay node of the first relay and the second relay node of the second relay to the floating state; and switch the second battery module alone using state to the key-off state when the power of the first battery module is supplied.

16. The system of claim 1, wherein the converter further comprises:

a low voltage DC-DC converter (LDC) configured to convert DC high voltage into DC low voltage; and a solar DC-DC converter (SDC) configured to convert power supplied from a solar cell installed into the DC low voltage, wherein the battery management system is configured to:

perform a control of a supplementary charging mode of charging the first battery module when a capacity of the first battery module is equal to or less than a predetermined level in a key-off situation of the car;

when the first relay node of the first relay and the second relay node of the second relay are in the floating state, open both ends of the third relay, and close both ends of the sixth relay and the seventh relay to supply the low voltage power by the low voltage of the first battery module;

determine whether the energy capacity of the first battery module is equal to or less than the predetermined level;

when it is determined that the energy capacity of the first battery module is equal to or less than the predetermined level, determine that supplementary charging of the first battery module is required;

close the first relay node of the first relay and the first contact point;

close the second relay node of the second relay and the second contact point;

apply the power from the second battery module by the converter; and supply the low-voltage power from the LDC to the first battery module to supplementally charge the first battery module.

17. The system of claim 16, wherein, when it is determined that the energy capacity of the first battery module is not equal to or less than the predetermined level, the battery management system is configured to charge supplementally the first battery module with the low-voltage power supplied by the SDC.

* * * * *